(12) United States Patent
Huh et al.

(10) Patent No.: US 9,256,005 B2
(45) Date of Patent: Feb. 9, 2016

(54) POLARIZING PLATE

(71) Applicant: LG CHEM, LTD., Seoul (KR)

(72) Inventors: Eun Soo Huh, Daejeon (KR); Ki Ok Kwon, Daejeon (KR); In Kyu Park, Daejeon (KR); Sung Soo Yoon, Daejeon (KR); Min Ki Lee, Daejeon (KR); Sae Han Cho, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 14/183,120

(22) Filed: Feb. 18, 2014

(65) Prior Publication Data

US 2014/0168580 A1 Jun. 19, 2014

Related U.S. Application Data

(63) Continuation of application No. PCT/KR2012/006578, filed on Aug. 17, 2012.

(30) Foreign Application Priority Data

| Aug. 19, 2011 | (KR) | 10-2011-0082852 |
| Aug. 19, 2011 | (KR) | 10-2011-0082860 |
| Aug. 17, 2012 | (KR) | 10-2012-0089887 |

(51) Int. Cl.
- *G02F 1/1335* (2006.01)
- *G02B 1/10* (2015.01)
- *G02B 5/30* (2006.01)

(52) U.S. Cl.
CPC .............. *G02B 1/105* (2013.01); *G02B 5/3033* (2013.01); *G02F 1/133528* (2013.01)

(58) Field of Classification Search
CPC ................................................ G02F 1/133528
See application file for complete search history.

(56) References Cited

U.S. PATENT DOCUMENTS

| 6,074,729 A * | 6/2000 | Watanabe et al. ............ 428/212 |
| 6,261,671 B1 * | 7/2001 | Asai et al. ..................... 428/206 |
| 2005/0036090 A1 * | 2/2005 | Hayashi et al. ............... 349/122 |
| 2007/0091229 A1 * | 4/2007 | Jang et al. ....................... 349/96 |
| 2009/0115945 A1 * | 5/2009 | Inokuchi et al. ................ 349/96 |
| 2009/0202752 A1 * | 8/2009 | Takahashi .................... 428/1.53 |
| 2010/0039590 A1 * | 2/2010 | Miyatake et al. ............... 349/96 |
| 2010/0283943 A1 * | 11/2010 | Kimura et al. .................. 349/96 |
| 2012/0314160 A1 * | 12/2012 | Hwang et al. .................. 349/96 |
| 2012/0314161 A1 * | 12/2012 | Park et al. ....................... 349/96 |
| 2012/0320317 A1 * | 12/2012 | Yoon et al. ...................... 349/96 |
| 2012/0328800 A1 * | 12/2012 | Yoon et al. .................... 428/1.55 |

FOREIGN PATENT DOCUMENTS

| CN | 1330106 A | 1/2002 |
| JP | 09-033723 | 2/1997 |
| JP | 2003-177241 A | 6/2003 |
| JP | 2007-111970 A | 5/2007 |
| JP | 2007-334307 | 12/2007 |
| JP | 2009-205141 A | 9/2009 |
| JP | 2009205141 A | * 9/2009 |
| KR | 10-2008-0004021 A | 1/2008 |
| KR | 10-2010-0078564 A | 7/2010 |
| KR | 1020100078564 A | 7/2010 |

\* cited by examiner

*Primary Examiner* — Jessica M Merlin
(74) *Attorney, Agent, or Firm* — Dentons US LLP

(57) ABSTRACT

Provided are a polarizing plate and a liquid crystal display device. The polarizing plate has lighter weight, a smaller thickness, and excellent physical properties such as durability, water resistance, workability, and light leakage preventing ability. In addition, the polarizing plate prevents curling occurring in the polarizing plate or a polarizer in formation thereof, and has excellent thermal resistance or thermal shock resistance.

11 Claims, 2 Drawing Sheets

POLARIZING PLATE

This application is a bypass continuation of International Application No. PCT/KR2012/006578, filed Aug. 17, 2012, and claims priority to and the benefit of Korean Application No. 10-2011-0082852, filed on Aug. 19, 2011, Korean Application No. 10-2011-0082860, filed on Aug. 19, 2011, and Korean Application No. 10-2012-0089887, filed on Aug. 17, 2012, the disclosure of which are incorporated herein by reference.

BACKGROUND

1. Field of the Invention

The present application relates to a polarizing plate and a liquid crystal display device.

2. Discussion of Related Art

A polarizing plate is an optically functional film applied to a device such as a liquid crystal display (LCD) device.

The polarizing plate may include a polarizer, which is a functional sheet capable of extracting light vibrating in only one direction from incident light vibrating in several directions, and protective films usually attached to both surfaces of the polarizer. The polarizing plate may further include a pressure-sensitive adhesive layer formed under the protective film and used to attach a liquid crystal panel to the polarizing plate, and a releasing film formed under the pressure-sensitive adhesive layer. In addition, the polarizing plate may include an additional functional film such as an anti-reflection film or a phase retardation film.

SUMMARY OF THE INVENTION

The present application is directed to a polarizing plate and a LCD device.

In one aspect, an exemplary polarizing plate includes: a polarizer, an active energy beam-curable adhesive layer, and a pressure-sensitive adhesive layer, which are sequentially disposed. The pressure-sensitive adhesive layer has first and second surfaces, which have different tensile modulus.

In the specification, "at least two elements sequentially disposed," for example, the term "A and B" sequentially disposed means that the elements A and B are disposed in sequence as described above, and another element C may be interposed between A and B, for example, A, C and B may be disposed in order as described above.

In addition, in the specification, when two elements are described as being attached or directly attached to each other, for example, "B is directly attached to A," may mean that no other element may be disposed on at least one main surface of A, and B may be directly attached thereto.

The exemplary polarizing plate includes a polarizer, an adhesive layer and a pressure-sensitive adhesive layer, which are sequentially disposed. In another example, in the polarizing plate, the adhesive layer may be directly attached to the polarizer, and the pressure-sensitive adhesive layer may also be directly attached to the adhesive layer. FIG. 1 shows a structure 1 of an exemplary polarizing plate, in which a polarizer 11, an adhesive layer 12 and a pressure-sensitive adhesive layer 13 are sequentially disposed.

Since the polarizer is usually manufactured of a hydrophilic resin such as polyvinylalcohol, it is generally vulnerable to moisture. In addition, since an extension process is generally performed in the manufacture of the polarizer, contraction easily occurs under a humid condition, and thus optical characteristics of the polarizing plate are degraded. Accordingly, to reinforce physical properties of the polarizing plate, a protective film represented by a triacetylcellulose (TAC) film is generally attached to both surfaces of the polarizer, and when there is no protective film, due to poor dimensional stability of the polarizer, durability and optical properties are greatly degraded, and water resistance is dramatically decreased.

To this end, in one exemplary structure of the polarizing plate of the present application, since a protective film is not attached to at least one main surface of the polarizer, a thinner and lighter structure and a structure in which an adhesive layer and a pressure-sensitive adhesive layer are directly and continuously attached to the main surface of the polarizer not having the protective film are employed. In addition, as the exemplary polarizing plate of the present application allows both main surfaces of the pressure-sensitive adhesive layer to have different peel strengths, a problem caused by poor dimensional stability of the polarizer may be solved. In the specification, the polarizing plate in which attachment of the protective film is omitted from at least one surface of the polarizer as described above may be referred to as a thin polarizing plate.

As the polarizer, one conventionally used in the art may be used without particular limitation. As a polarizer, for example, a polyvinylalcohol-based polarizer may be used. Such a polarizer may be formed by adsorbing and aligning a dichroic pigment on a polyvinylalcohol-based resin film. A polyvinylalcohol-based resin constituting the polarizer, for example, may be obtained by gelating a polyvinylacetate resin. As the polyvinylacetate resin, a homopolymer of vinyl acetate; and a copolymer of vinyl acetate and a different monomer polymerizable with the vinyl acetate may be used. An example of the monomer copolymerizable with vinyl acetate may be unsaturated carbonic acids, olefins, vinyl ethers, unsaturated sulfonic acids or acrylamides having an ammonium group, which are used alone or in combination of at least two thereof. However, the present application is not limited thereto. A degree of gelation for a polyvinyl alcohol resin may be usually about 85 to 100 mol %, for example, 98 mol % or more. The polyvinylalcohol resin may further be modified, and for example, polyvinylformal or polyvinylacetal modified with aldehydes may be used.

An active energy beam-curable adhesive layer is disposed at one side of the polarizer. The adhesive layer may play a critical role in ensuring physical properties of the polarizing plate when the polarizing plate is a thin polarizing plate. For example, the pressure-sensitive adhesive layer has first and second surfaces, and in one example, the first surface may have a higher tensile modulus than the second surface and be attached to the adhesive layer. In this case, since the first surface has a lower peel strength than the second surface, it may be easily peeled-off from the polarizer. However, in the present application, since the adhesive is disposed between the polarizer and the pressure-sensitive adhesive and cured after a single-molecular reactive material of the adhesive is penetrated or diffused into the pressure-sensitive adhesive before the adhesive layer is cured, the adhesive may allow the first surface of the pressure-sensitive adhesive layer to be swollen or may increase roughness of the surface. Thus, cohesion between the pressure-sensitive adhesive layer and the polarizer is ensured, and the polarizing plate can have excellent physical properties. In addition, since the active energy beam-curable adhesive is used instead of a water-based adhesive, curling of the polarizing plate caused by transformation of the polarizer and protective film due to heat generated in a thermal drying and curing operation of the water-based adhesive in an operation of manufacturing the polarizing plate may be prevented, and the polarizer may be effectively protected. As a result, cracks to be generated in the polarizer may be prevented even under a thermal resistant or thermal shock condition.

In the specification, the term "curing of an adhesive composition or pressure-sensitive adhesive composition" refers to an operation of changing an adhesive or pressure-sensitive adhesive composition to express adhesive or pressure-sensitive adhesive characteristics by a physical action or chemical reaction of components of the composition. In addition, in the specification, the term "active energy beam" may refer to microwaves, IR rays, UV rays, X rays, γ rays, or particle beams such as α particle beams, proton beams, neutron beams and electron beams, and conventionally UV rays or electron beams. In addition, the term "active energy beam-curable" used herein may mean that the curing may be induced by radiation with active energy beams. In one example, curing of the adhesive composition may be executed by a free radical polymerization or cationic reaction due to the radiation with active energy beams, for example, by simultaneously or sequentially performing the free radical polymerization and cationic reactions.

The adhesive layer may include a composition including an epoxy compound or an acryl-based monomer in a cured state, for example, a composition including an epoxy compound and an acryl-based monomer in a cured state. For example, the adhesive composition may include 5 to 80 parts by weight of the epoxy compound and 10 to 200 parts by weight of the acryl-based monomer, for example, 15 to 60 parts by weight of the epoxy compound and 20 to 150 parts by weight of the acryl-based monomer. When the epoxy compound and the acryl-based monomer are included within the content ranges described above, more effective curing of an adhesive composition may be induced, and physical properties may be enhanced by more effectively performing curing due to living characteristics of the cationic reaction which may induce a dark reaction in a state in which the radiation with active energy beams is finished. The unit "parts by weight" used herein refers to a weight ratio between components. An adhesive composition having excellent curing efficiency and physical properties after curing may be provided by controlling the ratio of the components of the adhesive composition.

The term "epoxy compound" used herein may refer to at least one or at least two of monomeric, oligomeric or polymeric compounds including epoxy groups.

The epoxy compound may enhance the physical properties of the adhesive layer such as water resistance and adhesive strength.

For example, as the epoxy compound, the epoxy compound which can be crosslinked or polymerized by a cationic reaction may be used.

In one example, as the epoxy compound, an epoxy resin having a weight average molecular weight (Mw) of 1,000 to 5,000 or 2,000 to 4,000 may be used. In the specification, the weight average molecular weight refers to a conversion value for reference polystyrene measured by gel permeation chromatography (GPC), and unless specifically defined otherwise, the term "molecular weight" refers to the "weight average molecular weight." When the molecular weight of the epoxy resin is 1,000 or more, the durability of the adhesive layer may be suitably maintained, and when the molecular weight of the epoxy resin is 5,000 or less, workability, such as coatability of the composition may be effectively maintained.

In one example, as the epoxy compound, an alicyclic epoxy compound or glycidyl ether-type epoxy compound may be used, for example, a mixture of the alicyclic epoxy compound and the glycidyl ether-type epoxy compound may be used.

The term "alicyclic epoxy compound" used herein may refer to a compound including at least one epoxylated aliphatic ring, and the term "glycidyl ether-type epoxy compound" may refer to a compound including at least one glycidyl ether group.

As the alicyclic epoxy compound is included in the epoxy compound, a glass transition temperature of the adhesive composition is increased, and thus the adhesive layer has sufficient durability. Therefore, even when the protective film is formed on only one surface of the polarizer, occurrence of cracks in the polarizer may be prevented even under a thermal resistant or thermal shock condition.

In the alicyclic epoxy compound including an epoxylated aliphatic ring, for example, the epoxylated aliphatic ring may refer to a compound having an epoxy group formed in an alicyclic ring. Here, a hydrogen atom constituting the alicyclic ring may be optionally substituted with a substituent such as an alkyl group. As the alicyclic epoxy compound, for example, a compound to be specifically exemplified below may be used, but a kind of the epoxy compound capable of being used herein is not limited to the following example.

As the alicyclic epoxy compound, first, an epoxycyclohexylmethyl epoxycyclohexanecarboxylate-based compound represented by Formula 1 may be used:

[Formula 1]

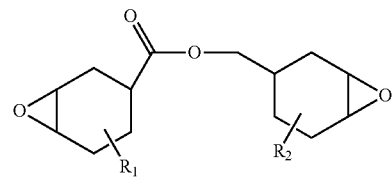

In Formula 1, $R_1$ and $R_2$ are each independently hydrogen or an alkyl group.

The term "alkyl group" used herein, unless specifically defined otherwise, may refer to a linear, branched or cyclic alkyl group having 1 to 20, 1 to 16, 1 to 12, 1 to 8, or 1 to 4 carbon atoms, and the alkyl group may be unsubstituted or optionally substituted with at least one substituent.

As an another example of the alicyclic epoxy compound, an epoxycyclohexane carboxylate-based compound of alkane diol represented by Formula 2 may be used:

[Formula 2]

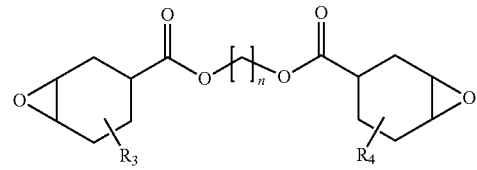

In Formula 2, $R_3$ and $R_4$ are each independently hydrogen or an alkyl group, and n represents an integer between 2 and 20.

In addition, as still another example of the alicyclic epoxy compound, an epoxy cyclohexylmethyl ester-based compound of dicarboxylic acid represented by Formula 3 may be used:

[Formula 3]

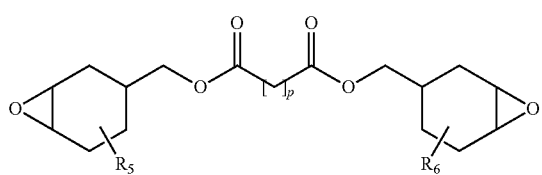

In Formula 3, $R_5$ and $R_6$ are each independently hydrogen or an alkyl group, and p represents an integer between 2 and 20.

As yet another example of the alicyclic epoxy compound, an epoxycyclohexylmethyl ether-based compound of polyethyleneglycol represented by Formula 4 may be used:

[Formula 4]

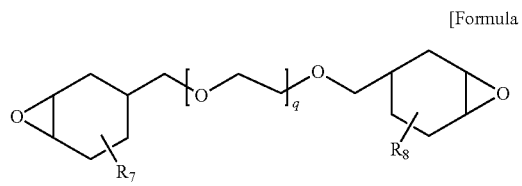

In Formula 4, $R_7$ and $R_8$ are each independently hydrogen or an alkyl group, and q is an integer between 2 and 20.

As yet another example of the alicyclic epoxy compound, an epoxycyclohexylmethyl ether-based compound of alkane diol represented by Formula 5 may be used:

[Formula 5]

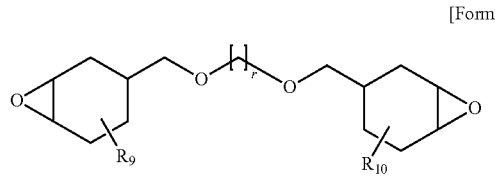

In Formula 5, $R_9$ and $R_{10}$ are each independently hydrogen or an alkyl group, and r is an integer between 2 and 20.

As yet another example of the alicyclic epoxy compound, a diepoxytrispiro-based compound represented by Formula 6 may be used:

[Formula 6]

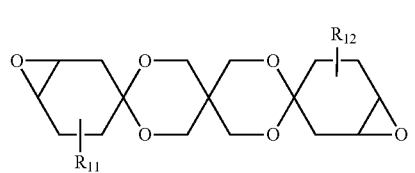

In Formula 6, $R_{11}$ and $R_{12}$ are each independently hydrogen or an alkyl group.

As yet another example of the alicyclic epoxy compound, a diepoxymonospiro-based compound represented by Formula 7 may be use:

[Formula 7]

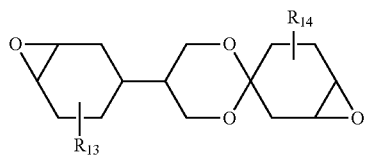

In Formula 7, $R_{13}$ and $R_{14}$ are each independently hydrogen or an alkyl group.

As yet another example of the alicyclic epoxy compound, a vinylcyclohexene diepoxide compound represented by Formula 8 may be used:

[Formula 8]

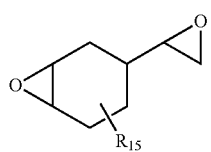

In Formula 8, $R_{15}$ is hydrogen or an alkyl group.

As yet another example of the alicyclic epoxy compound, an epoxycyclopentyl ether compound represented by Formula 9 may be used:

[Formula 9]

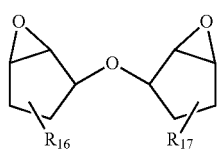

In Formula 9, $R_{16}$ and $R_{17}$ are each independently hydrogen or an alkyl group.

As yet another example of the alicyclic epoxy compound, a diepoxy tricyclodecane compound represented by Formula 10 may be used:

[Formula 10]

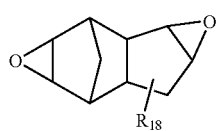

In Formula 10, $R_{18}$ is hydrogen or an alkyl group.

In further detail, the alicyclic epoxy compound may be, but is not limited to, an epoxycyclohexylmethyl epoxycyclohexane carboxylate compound, an epoxycyclohexane carboxylate compound of alkane diol, an epoxycyclohexylmethyl ester compound of dicarboxylic acid or an epoxycyclohexylmethyl ether compound of alkane diol, for example, at least one selected from the group consisting of an esterification product of 7-oxabicyclo[4,1,0]heptane-3-carboxylic acid and (7-oxa-bicyclo[4,1,0]hepto-3-yl)methanol (a compound of Formula 1 in which $R_1$ and $R_2$ are hydrogen); an esterification product of 4-methyl-7-oxabicyclo[4,1,0]heptane-3-carboxylic acid and (4-methyl-7-oxa-bicyclo[4,1,0]hepto-3-yl)methanol (a compound of Formula 1 in which $R_1$ and $R_2$ are 4-$CH_3$); an esterification product of 7-oxabicyclo[4,1,0]heptane-3-carboxylic acid and 1,2-ethanediol (a compound of Formula 2 in which $R_3$ and $R_4$ are hydrogen, and n is 1); an esterification product of (7-oxabicyclo[4,1,0]hepto-3-yl)methanol and adipic acid (a compound of Formula 3 in which $R_5$ and $R_6$ are hydrogen, and p is 2); an esterification product of (4-methyl-7-oxabicyclo[4,1,0]hepto-3-yl)methanol and adipic acid (a compound of Formula 3 in which $R_5$ and $R_6$ are 4-$CH_3$, and p is 2); and an esterification product of (7-oxabicyclo[4,1,0]hepto-3-yl)methanol and 1,2-ethanediol (a compound of Formula 5 in which $R_9$ and $R_{10}$ are hydrogen, and r is 1).

In addition, as the glycidyl ether-type epoxy compound is included in the epoxy compound, a glycidyl ether functional group may form a soft chain having polarity in the adhesive layer after a curing reaction, and thus adhesive strength of the adhesive layer with respect to a PVA polarizer may be enhanced.

In one example, the glycidyl ether-type epoxy compound may include, for example, aliphatic polyhydric alcohol or alkyleneoxide thereof, for example, polyglycidyl ether of an ethyleneoxide or propyleneoxide addition product.

In one example, when a mixture of an alicyclic epoxy compound and a glycidyl ether-type epoxy compound is used as the epoxy compound, the alicyclic epoxy compound may be 3,4-epoxycyclohexylmethyl, 3,4-epoxycyclohexanecarboxylate, bis(3,4-epoxycyclohexylmethyl)adipatedicyclopentadienedioxide, limonenedioxide or 4-vinylcyclohexenedioxide, and the glycidyl ether-type epoxy compound may be an epoxy compound having an epoxy group other than the alicyclic epoxy group. That is, the glycidyl ether-type epoxy compound may be novolac epoxy, bisphenol A-based epoxy, bisphenol F-based epoxy, brominated bisphenol epoxy, n-butyl glycidylether, aliphatic glycidylether (12 to 14 carbon atoms), 2-ethylhexylglycidyl ether, phenyl glycidyl ether, o-cresyl glycidyl ether, nonyl phenyl glycidyl ether, ethyleneglycol diglycidylether, diethyleneglycol diglycidylether, propyleneglycol diglycidylether, tripropyleneglycol diglycidylether, neopentylglycol diglycidylether, 1,4-butanediol diglycidylether, 1,6-hexanediol diglycidylether, trimethylolpropane triglycidylether, trimethylolpropane diglycidylether, trimethylolpropane polyglycidylether, polyethyleneglycol diglycidylether, or glycerin triglycidylether, And the glycidyl ether-type epoxy compound may be, for example, glycidyl ether having a cyclic aliphatic backbone such as 1,4-cyclohexanedimethanol diglycidyl ether or a hydrogenated compound of an aromatic epoxy compound. In one example, the glycidyl ether-type epoxy compound may be, glycidyl ether having a cyclic aliphatic backbone. The glycidyl ether having a cyclic aliphatic backbone may have 3 to 20 carbon atoms, 3 to 16 carbon atoms or 3 to 12 carbon atoms. However, the present application is not limited thereto.

In this case, the epoxy compound may include 5 to 40 parts by weight of the alicyclic epoxy compound and 5 to 30 parts by weight of the glycidyl ether-type epoxy compound, for example, 15 to 40 parts by weight of the alicyclic epoxy compound and 15 to 30 parts by weight of the glycidyl ether-type epoxy compound or 20 to 30 parts by weight of the alicyclic epoxy compound and 20 to 30 parts by weight of the glycidyl ether-type epoxy compound. When the alicyclic epoxy compound is included at 5 parts by weight or more, the sufficient durability of the adhesive layer may be ensured, and when the alicyclic epoxy compound is included at 40 parts by weight or less, the adhesive strength to the PVA polarizer is not decreased. When the glycidyl ether-type epoxy compound is included at 5 parts by weight or more, the adhesive strength is increased, and when the glycidyl ether-type epoxy compound is included at 30 parts by weight or less, the durability of the adhesive layer is not decreased.

Here, the alicyclic epoxy compound and the glycidyl ether-type epoxy compound may be included in a weight ratio of 3:1 to 1:3, and within this range, an effect of enhancing the durability of the adhesive layer and the adhesive strength of the adhesive layer with respect to the PVA polarizer may be maximized.

The adhesive composition further includes a radical polymerizable compound. For example, the radical polymerizable compound may be an acryl-based monomer. The term "radical polymerizable compound" used herein may refer to a compound including at least one polymerizable functional group capable of participating in a crosslinking reaction in a molecular structure, for example, a free radical polymerization reaction. The polymerizable functional group may be, but is not limited to, an allyl group, an allyloxy group, an acryloyl group, a methacryloyl group or acrylonitrile.

In one example, the acryl-based monomer may include a hydrophilic acryl-based monomer or a hydrophobic acryl-based monomer. For example, the acryl-based monomer may include a mixture of a hydrophilic acryl-based monomer and a hydrophobic acryl-based monomer.

For example, to enhance the adhesive strength of the adhesive layer to the PVA polarizer, the hydrophilic acryl-based monomer may be included in the acryl-based monomer.

Here, the term "hydrophilic acryl-based monomer" may refer to an acryl-based monomer having hydrophilicity, simultaneously including a polymerizable functional group and a polar functional group in a molecular structure, and the polar functional group may be, but is not limited to, a hydroxyl group, a carboxyl group or an alkoxy group.

For example, the hydrophilic acryl-based monomer may be at least one of the compounds represented by Formulas 11 to 13. For example, the hydrophilic acryl-based monomer may be the compound represented by Formula 11, but the present application is not limited thereto.

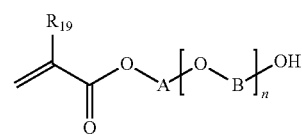

[Formula 11]

In Formula 11, $R_{19}$ is hydrogen or an alkyl group, A and B are each independently an alkylene group or an alkylidene group, and n is a number between 0 and 5.

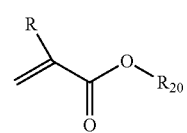

[Formula 12]

In Formula 12, R is hydrogen or an alkyl group, and $R_{20}$ is hydrogen or -$A_3$-C(=O)—OH, in which $A_3$ is an alkylene group or an alkylidene group.

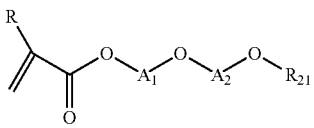
[Formula 13]

In Formula 13, R is hydrogen or an alkyl group, $R_{21}$ is an alkyl group, and $A_1$ and $A_2$ are each independently an alkylene group or an alkylidene group.

The term "alkylene group or alkylidene group" used herein may be a substituted or unsubstituted linear, branched or cyclic alkylene or alkylidene group, which has 1 to 20, 1 to 16, 1 to 12, 1 to 8, or 1 to 4 carbon atoms. For example, the alkylene or alkylidene group may be a linear or branched alkylene or alkylidene group having 1 to 12, 1 to 8 or 1 to 4 carbon atoms.

In Formula 11, n is a number between 0 and 3, and more for example, between 0 and 2.

In addition, in the compound of Formula 12, $R_{20}$ is hydrogen or $—(CH_2)_m—C(=O)—OH$ (m is an integer between 1 and 4).

In addition, in the compound of Formula 13, $R_{21}$ may be alkyl having 1 to 4 carbon atoms, and $A_1$ and $A_2$ may be each independently alkylene having 1 to 4 carbon atoms.

The compound of Formula 11 may be 2-hydroxyethyl (meth)acrylate, 2-hydroxypropyl (meth)acrylate, 4-hydroxybutyl (meth)acrylate, 6-hydroxyhexyl (meth)acrylate, 8-hydroxyoctyl (meth)acrylate, 2-hydroxyethyleneglycol (meth)acrylate or 2-hydroxypropyleneglycol(meth)acrylate, the compound of Formula 12 may be acrylic acid, methacrylic acid or β-carboxyethyl (meth)acrylate, and the compound of Formula 13 may be 2-(2-ethoxyethoxy)ethyl (meth)acrylate, but the present application is not limited thereto.

In one example, the hydrophilic acryl-based monomer may be the compound represented by Formula 11.

The acryl-based monomer may include 10 to 80 parts by weight of the hydrophilic monomer or 20 to 60 parts by weight of the hydrophilic monomer. When the hydrophilic monomer is included in the above range, adhesive strength of the pressure-sensitive adhesive layer with respect to the PVA polarizer may be enhanced.

In addition, in one example, the acryl-based monomer may include at least one hydrophobic acryl-based monomer to control attachment strength, compatibility and glass transition temperature.

Here, the hydrophobic acryl-based monomer may be, for example, acrylic acid ester of an aromatic compound, methacrylic acid ester of an aromatic compound, alkyl acrylate or alkyl methacrylate having a long chain alkyl group, for example, an alkyl group having 9 or more carbon atoms, for example, 9 to 15 carbon atoms, or acrylic acid ester or methacrylic acid ester of an alicyclic compound.

In one example, the hydrophobic acryl-based monomer may be a compound represented by Formula 14 and/or a compound represented by Formula 15.

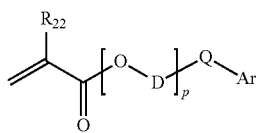
[Formula 14]

In Formula 14, $R_{22}$ is hydrogen or an alkyl group, D is an alkylene group or an alkylidene group, Q is a single bond, an oxygen atom or a sulfur atom, Ar is an aryl group, and p is a number between 0 and 3.

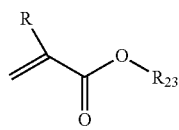
[Formula 15]

In Formula 15, R is hydrogen or an alkyl group, and $R_{23}$ is a monovalent residue derived from an alkyl group having 9 or more carbon atoms or a monovalent residue derived from an alicyclic compound.

In Formula 14, the term "single bond" means that there is no separate atom in the part represented by Q, and D or a carbon atom of $C(=O)$ is directly connected to Ar.

In addition, in Formula 14, an aryl group refers to a monovalent residue derived from a compound including a structure including benzene or a structure in which at least two benzenes are connected to each other or condensed, or a derivative thereof. The aryl group, for example, may be an aryl group having 6 to 22 carbon atoms, 6 to 16 carbon atoms or 6 to 13 carbon atoms, and for example, a phenyl group, a phenylethyl group, a phenylpropyl group, a benzyl group, a tollyl group, a xylyl group or a naphthyl group.

In addition, in Formula 14, p is 0 or 1.

In addition, in the compound of Formula 15, $R_{23}$ is a monovalent residue derived from an alicyclic compound having 3 to 20 carbon atoms, for example, 6 to 15 carbon atoms or $R_{23}$ is an alkyl group having 9 to 15 carbon atoms.

The compound of Formula 14 may be, but is not limited to, phenoxy ethyl (meth)acrylate, benzyl (meth)acrylate, 2-phenylthio-1-ethyl (meth)acrylate, 6-(4,6-dibromo-2-isopropyl phenoxy)-1-hexyl (meth)acrylate, 6-(4,6-dibromo-2-sec-butyl phenoxy)-1-hexyl (meth)acrylate, 2,6-dibromo-4-nonylphenyl (meth)acrylate, 2,6-dibromo-4-dodecyl phenyl (meth)acrylate, 2-(1-naphthyloxy)-1-ethyl (meth)acrylate, 2-(2-naphthyloxy)-1-ethyl (meth)acrylate, 6-(1-naphthyloxy)-1-hexyl (meth)acrylate, 6-(2-naphthyloxy)-1-hexyl (meth)acrylate, 8-(1-naphthyloxy)-1-octyl (meth)acrylate or 8-(2-naphthyloxy)-1-octyl (meth)acrylate, conventionally phenoxy ethyl (meth)acrylate, benzyl(meth)acrylate 2-phenylthio-1-ethyl acrylate, 8-(2-naphthyloxy)-1-octyl acrylate or 2-(1-naphthyloxy)-ethyl acrylate. For example, the compound of Formula 14 may be phenoxy ethyl (meth)acrylate or benzyl (meth)acrylate.

The compound of Formula 15 may be, but is not limited to, isobornyl (meth)acrylate, cyclohexyl (meth)acrylate, norbornanyl (meth)acrylate, norbornenyl (meth)acrylate, dicyclopentadienyl (meth)acrylate, ethynylcyclohexane(meth)acrylate, ethynylcyclohexene(meth)acrylate or ethynyldecahydronaphthalene(meth)acrylate. For example, the compound of Formula 15 may be isobornyl (meth)acrylate.

As the acryl-based monomer, the hydrophobic acryl-based monomer may be used, for example, at 60 parts by weight or less, for example, 10 to 60 parts by weight. When the hydrophobic acryl-based monomer is included at less than 10 parts by weight, the number of hydrophilic functional groups is more than that of hydrophobic functional groups, and thus a water resistant characteristic of the polarizing plate may be degraded. When the hydrophobic acryl-based monomer is included at more than 60 parts by weight, the attachment strength to the PVA polarizing element may be degraded.

In addition, for example, when the compound of Formula 14 is used as the hydrophobic compound, the compound may be included, for example, at 0 to 40 parts by weight or 10 to 30 parts by weight. In addition, when the compound of Formula 15 is used as the hydrophobic compound, the compound may be included, for example, at 0 to 30 parts by weight or 5 to 20 parts by weight. In such a weight ratio, the attachment strength to a base, for example, an acryl protective film to be described below, may be maximized.

In one example, the adhesive composition may further include a reactive oligomer. The term "reactive oligomer" refers to a compound formed by polymerizing at least two monomers, and includes all compounds having a polymerizable functional group capable of participating in a crosslinking reaction, for example, the kind of polymerizable functional group previously described in the description of the radical polymerizable compound.

The reactive oligomer may be, but is not limited to, a photo-reactive oligomer known in the art, urethane acrylate, polyester acrylate, polyether acrylate or epoxy acrylate. For example, the reactive oligomer may be urethane acrylate.

In the adhesive composition, the reactive oligomer may be included, for example, at 1 to 40 parts by weight or 5 to 20 parts by weight. In such a weight ratio, a synergistic effect of the glass transition temperature of the adhesive layer may be maximized.

The adhesive composition may further include a cationic initiator as an initiator for starting a curing reaction. As the cationic initiator, any one starting a cationic reaction by application or radiation of light without particular limitation, for example, a cationic photoinitiator for starting a cationic reaction by radiation with active energy beams, may be used.

In one example, the cationic photoinitiator may be an onium salt- or organometallic salt-based ionic cationic initiator, or a non-ionic cationic photoinitiator such as an organic silane- or latent sulfonic acid-based cationic photoinitiator or other non-ionic compounds. The onium salt-based initiator may be diaryliodonium salt, triarylsulfonium salt or aryldiazonium salt, the organometallic salt-based initiator may be iron arene, the organic silane-based initiator may be o-nitrobenzyl triaryl silyl ether, triaryl silyl peroxide or acyl silane, and the latent sulfonic acid-based initiator may be α-sulfonyloxy ketone or α-hydroxymethylbenzoin sulfonate. However, the present application is not limited thereto. In addition, as the cationic initiator, a mixture of an iodine-based initiator and a photosensitizer may be used.

The cationic initiator is an ionized cationic photoinitiator, for example, an onium salt-based ionized cationic photoinitiator. In one example, the cationic initiator is a triacrylsulfonium salt-based ionized cationic photoinitiator. However, the present application is not limited thereto.

The adhesive composition may include 0.01 to 10 parts by weight, for example, 0.1 to 5 parts by weight of the cationic initiator. In this range, the adhesive composition may have excellent curing efficiency and physical properties after curing.

The adhesive composition may further include a photoinitiator as a radical initiator capable of starting a polymerization or crosslinking reaction of an acryl-based monomer. For example, the photoinitiator may be an initiator such as benzoin-based photoinitiator, a hydroxyketone compound, an aminoketone compound or a phosphine oxide compound. In one example, the photoinitiator may be a phosphine oxide compound. In detail, the photoinitiator may be, but is not limited to, benzoin, benzoin methylether, benzoin ethylether, benzoin isopropylether, benzoin n-butylether, benzoin isobutylether, acetophenone, dimethylamino acetophenone, 2,2-dimethoxy-2-phenylacetophenone, 2,2-diethoxy-2-phenylacetophenone, 2-hydroxy-2-methyl-1-phenylpropane-1-one, 1-hydroxy cyclohexylphenylketone, 2-methyl-1-[4-(methylthio)phenyl]-2-morpholino-propane-1-one, 4-(2-hydroxyethoxy)phenyl-2-(hydroxy-2-propyl)ketone, benzophenone, p-phenylbenzophenone, 4,4'-diethylamino benzophenone, dichloro benzophenone, 2-methylanthraquinone, 2-ethylanthraquinone, 2-t-butylanthraquinone, 2-aminoanthraquinone, 2-methyl thioxanthone, 2-ethylthioxanthone, 2-chlorothioxanthone, 2,4-dimethylthioxanthone, 2,4-diethylthioxanthone, benzyldimethylketal, acetophenone dimethylketal, p-dimethylamino benzoic acid ester, oligo[2-hydroxy-2-methyl-1-[4-(1-methylvinyl)phenyl]propanone], bis(2,4,6-trimethylbenzoyl)-phenyl-phosphineoxide or 2,4,6-trimethylbenzoyl-diphenyl-phosphineoxide.

In the adhesive composition, the photoinitiator may be included at 0.1 to 10 parts by weight, for example, 0.5 to 5 parts by weight, and in this range, effective polymerization and crosslinking may be induced, and degradation in physical properties due to reaction residues may be prevented.

The adhesive composition may also use an initiator generating a radical by absorbing active energy beams having a long wavelength, that is, a long-wavelength photoinitiator, as a radical initiator. Such an initiator may be used alone or in combination with a different kind of initiator.

That is, in the protective film included in the polarizing plate, a UV protector may be mixed to protect the polarizer from UV rays. In this case, when electromagnetic waves are radiated to cure the adhesive composition, electromagnetic waves having a short wavelength, for example, a wavelength of approximately 365 nm or less, are absorbed by the protective film, and thus the suitable curing reaction may not progress. To prevent this problem, the radical initiator may include an initiator capable of generating radicals by absorbing electromagnetic waves having a long wavelength, for example, a wavelength of approximately 365 nm or more.

The long-wavelength photoinitiator may be, for example, diphenyl(2,4,6-trimethylbenzoyl)-phosphineoxide, or bis(2,4,6-trimethylbenzoyl)-phenylphosphineoxide. For example, the long-wavelength photoinitiator may be Darocur TPO or Irgacure 819 produced by Ciba Specialty Chemicals, Switzerland, but the present application is not limited thereto.

The adhesive composition may further include an additive such as a photosensitizer, an antioxidant or an attachment enhancing agent, or a known oligomer component to control adhesion performance and brittleness when necessary.

In one example, the adhesive composition may be formulated in a non-solvent type. The non-solvent type composition may mean a kind of adhesive composition not including an organic or water-based solvent component used to dilute components constituting the adhesive composition. As the adhesive composition is formulated in a non-solvent type, a volatilization process for a solvent is not necessary in the formation of the adhesive layer, thickness uniformity may be effectively maintained, and curling of the polarizer may be effectively prevented.

The adhesive composition may have a viscosity at 25° C. of 5 to 1,000 cps, for example, 10 to 100 cps. As the viscosity is controlled in this range, process efficiency, ease of controlling a thickness and thickness uniformity may be ensured, and the physical properties such as the adhesive characteristic may be effectively maintained.

A method of forming the adhesive layer on the polarizer using the composition is not particularly limited, and thus, for example, a method of coating an adhesive composition on the polarizer and curing the composition, or coating the adhesive composition on the polarizer, laminating the pressure-sensitive adhesive layer again and curing the coated adhesive composition, may be used. In this case, the curing of the adhesive composition may be executed by a method of radiating active energy beams having a suitable intensity to induce a polymerization or crosslinking reaction of the component in consideration of each component.

The adhesive layer may have a thickness of 0.1 to 30 µm, 0.5 to 15 µm, or 1 to 10 µm. As the thickness of the adhesive layer is controlled to 0.1 µm or more, the water resistance of the polarizing plate may be excellently maintained, and when the thickness of the adhesive layer is controlled to 30 µm or less, the thin polarizing plate having a uniform adhesive layer and excellent physical properties may be formed.

The pressure-sensitive adhesive layer included in the polarizing plate has first and second surfaces which have different tensile modulus. In one example, the first surface has a higher tensile modulus than the second surface and is directly attached to the adhesive layer, and the second surface may be a pressure-sensitive adhesive surface to attach the polarizing plate to a liquid crystal panel.

FIG. 2 exemplifies a pressure-sensitive adhesive layer 2 having first and second surfaces 21 and 22.

As described above, in the pressure-sensitive adhesive layer, when the first surface attached to the adhesive layer is set to have a higher tensile modulus than that of the second surface, contraction or expansion of the polarizer under a severe condition such as a high temperature or high humidity condition may be effectively inhibited. In addition, as the second surface attaching the polarizing plate to a glass substrate of the liquid crystal panel is set to have a lower tensile modulus than the first surface, excellent wettability may be ensured.

In one example, the first surface may have a tensile modulus at 25° C. of 1 to 1,000 MPa, 10 to 900 MPa or 250 to 500 MPa. In addition, in one example, the second surface may have a tensile modulus at 25° C. of 0.01 to 1.0 MPa, 0.02 to 0.8 MPa or 0.03 MPa to 0.7 MPa. As the tensile modulus of the first and second surfaces are controlled within the above-mentioned ranges, the pressure-sensitive adhesive layer may effectively inhibit the contraction or expansion of the polarizer under a severe condition, and have excellent wettability to the adherent such as the glass substrate.

A method of constituting the pressure-sensitive adhesive layer having different tensile modulus on both surfaces is not particularly limited. In one example, the pressure-sensitive adhesive layer may be a multi-layered pressure-sensitive adhesive layer constituted by stacking at least two kinds of pressure-sensitive adhesive layers having different tensile modulus.

For example, as shown in FIG. 3, the pressure-sensitive adhesive layer 3 may include a first pressure-sensitive adhesive layer 31 forming a first surface 21, and a second pressure-sensitive adhesive layer 32 forming a second surface 22, and tensile modulus of the respective pressure-sensitive adhesive layers 31 and 32 may be differently controlled, thereby realizing a pressure-sensitive adhesive layer having different tensile modulus on both surfaces. The pressure-sensitive adhesive layer may be formed in a multi-layered structure such as a double-layered structure as shown in FIG. 3, or at least triple-layered structure in some cases.

The pressure-sensitive adhesive layer may have a total thickness of, for example, approximately 10 to 80 µm, 20 to 60 µm or 30 to 50 µm. As the total thickness of the pressure-sensitive adhesive layer is controlled as described above, the polarizing plate may have a small thickness and excellent physical properties such as durability under a severe condition. In addition, when the pressure-sensitive adhesive layer is formed in a double-layered structure as shown in FIG. 3, the first pressure-sensitive adhesive layer may have a thickness of 4 to 50 µm, and the second pressure-sensitive adhesive layer may have a thickness of 5 to 50 µm. As the thickness of the first pressure-sensitive adhesive layer is controlled within a range of 4 to 50 µm, the contraction or expansion of the polarizer may be effectively prevented. In addition, as the second pressure-sensitive adhesive layer is controlled within a range of 5 to 50 µm, the wettability of the pressure-sensitive adhesive layer or the durability of the polarizing plate may be effectively maintained. Although the pressure-sensitive adhesive layer is formed in a multi-layered structure, a sum of the thicknesses of the first and second pressure-sensitive adhesive layers may satisfy the above-mentioned range of the total thickness.

A method of forming the pressure-sensitive adhesive layer is not particularly limited. For example, the pressure-sensitive adhesive layer may be formed by curing a conventional room temperature-curable, moisture-curable, heat-curable or photocurable pressure-sensitive adhesive composition. In addition, to realize the multi-layered pressure-sensitive adhesive layer, a method of subsequently repeating coating and curing processes of the pressure-sensitive adhesive composition, or laminating separately manufactured pressure-sensitive adhesive layers to each other may be used.

In one example, when the pressure-sensitive adhesive layer is formed in a multi-layered structure, the pressure-sensitive adhesive layer disposed at a side of the polarizer, for example, the first pressure-sensitive adhesive layer in the double-layered structure, may be a pressure-sensitive adhesive layer composed of a photocurable pressure-sensitive adhesive composition, but the present application is not limited thereto. The term "photocurable pressure-sensitive adhesive composition" may refer to a pressure-sensitive adhesive composition which may be cured by inducing a polymerization or crosslinking reaction by radiation with electromagnetic waves, for example, UV rays or electron beams.

In one example, the pressure-sensitive adhesive layer may include a so called interpenetrating polymer network (hereinafter referred to as "IPN"). The term "IPN" may refer to a state in which at least two kinds of crosslinking structures are present in the pressure-sensitive adhesive layer, and in one example, the crosslinking structure may be present in an entangled, linked or penetrated state. When the pressure-sensitive adhesive layer includes the IPN, a polarizing plate having excellent durability under a severe condition, and excellent workability, optical characteristics and a light leakage preventing ability.

When the pressure-sensitive adhesive layer includes the IPN structure, the first pressure-sensitive adhesive layer may include, for example, a crosslinking structure of an acryl polymer crosslinked by a multifunctional crosslinking agent and a crosslinking structure of a polymerized multifunctional acrylate.

Here, as the acryl polymer crosslinked by the multifunctional crosslinking agent, for example, an acryl polymer having a weight average molecular weight (Mw) of 500,000 or more may be used. When the weight average molecular weight (Mw) of the polymer is 500,000 or more, a pressure-sensitive adhesive layer having excellent durability under a severe condition may be formed. The upper limit of the molecular weight is not particularly limited, and for example, in consideration of the durability of the pressure-sensitive adhesive or coatability of the composition, the molecular weight may be controlled within a range of 2,500,000 or less.

In one example, the acryl polymer may be a polymer including a (meth)acrylic acid ester-based monomer in a polymerization unit.

As the (meth)acrylic acid ester-based monomer, for example, alkyl (meth)acrylate may be used, and in consideration of cohesive strength, glass transition temperature or pressure-sensitive adhesion of the pressure-sensitive adhesive, alkyl (meth)acrylate including an alkyl group having 1 to 14 carbon atoms may be used. Such a monomer may be methyl (meth)acrylate, ethyl (meth)acrylate, n-propyl (meth)acrylate, isopropyl (meth)acrylate, n-butyl (meth)acrylate, t-butyl (meth)acrylate, sec-butyl (meth)acrylate, pentyl (meth)acrylate, 2-ethylhexyl (meth)acrylate, 2-ethylbutyl (meth)acrylate, n-octyl (meth)acrylate, isooctyl (meth)acrylate, isononyl (meth)acrylate, lauryl (meth)acrylate or tetradecyl (meth)acrylate, which may be used alone or in combination of at least two thereof.

The polymer may further include a crosslinkable monomer in a polymerization unit. The polymer is a polymer including 50 to 99.9 parts by weight of the (meth)acrylic acid ester-based monomer and 0.1 to 50 parts by weight of the crosslinkable monomer in a polymerized form. Here, the "crosslinkable monomer" refers to a monomer capable of being copolymerized with the (meth)acrylic acid ester-based monomer, which may provide a crosslinkable functional group to a side chain or terminal end of the polymer after copolymerization.

As the crosslinkable monomer, a monomer which may serve to control the durability, pressure-sensitive adhesive strength and cohesive strength of the pressure-sensitive adhesive, and to provide, for example, a hydroxyl group, a carboxyl group, an epoxy group, an isocyanate group or a nitrogen-containing functional group such as an amino group to the polymer, and may be copolymerizable with the (meth)acrylic acid ester-based monomer. Various monomers serving as described above are known in the art, and herein all of them may be used. In detail, the crosslinkable monomer may be, but is not limited to, a monomer having a hydroxyl group such as 2-hydroxyethyl (meth)acrylate, 2-hydroxypropyl (meth)acrylate, 4-hydroxybutyl (meth)acrylate, 6-hydroxyhexyl (meth)acrylate, 8-hydroxyoctyl (meth)acrylate, 2-hydroxyethyleneglycol (meth)acrylate or 2-hydroxypropyleneglycol (meth)acrylate, a monomer having a carboxyl group such as (meth)acrylic acid, 2-(meth)acryloyloxy acetic acid, 3-(meth)acryloyloxy propylic acid, 4-(meth)acryloyloxy butyric acid, acrylic acid dimer, itaconic acid, maleic acid or maleic anhydride, a monomer having an epoxy group such as glycidyl (meth)acrylate, or a monomer having nitrogen such as (meth)acrylamide, N-vinyl pyrrolidone or N-vinyl caprolactame, which may be used alone or in combination of at least two thereof.

The acryl polymer may further include a monomer represented by Formula 16 in a polymerized form when necessary. Such a monomer may be added to control a glass transition temperature and provide other functionalities.

[Formula 16]

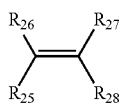

In Formula 16, $R_{25}$ and $R_{27}$ are each independently hydrogen or alkyl, $R_{28}$ is cyano group; phenyl group which is unsubstituted or substituted with alkyl; acetyloxy group; or $COR_{29}$ in which $R_{29}$ is glycidyloxy group, or amino group which is unsubstituted or substituted with alkyl or alkoxyalkyl.

The monomer of Formula 16 may be included at 20 parts by weight or less based on the weight of the (meth)acrylic acid ester-based monomer or crosslinkable monomer, but the weight ratio may be changed according to the purpose.

The acryl polymer may be prepared by applying a conventional polymerization method such as solution polymerization, photopolymerization, bulk polymerization, suspension polymerization or emulsion polymerization to a mixture of monomers having respective components described above.

As a multifunctional crosslinking agent crosslinking the acryl polymer in the pressure-sensitive adhesive layer, for example, a general crosslinking agent such as an isocyanate crosslinking agent, an epoxy crosslinking agent, an aziridin crosslinking agent, or a metal chelate crosslinking agent may be used. For example, an isocyanate crosslinking agent is used, but the present application is not limited thereto. As the isocyanate crosslinking agent, a multifunctional isocyanate compound such as tolylene diisocyanate, xylene diisocyanate, diphenylmethane diisocyanate, hexamethylene diisocyanate, isophorone diisocyanate, tetramethylxylene diisocyanate or naphthalene diisocyanate, or a compound prepared by reacting the multifunctional isocyanate compound with a polyol compound such as trimethylol propane may be used. As the epoxy crosslinking agent, at least one selected from the group consisting of ethyleneglycol diglycidylether, triglycidylether, trimethylolpropane triglycidylether, N,N,N',N'-tetraglycidyl ethylenediamine and glycerin diglycidylether may be used, and as the aziridine crosslinking agent, at least one selected from the group consisting of N,N'-toluene-2,4-bis(1-aziridine carboxamide), N,N'-diphenylmethane-4,4'-bis(1-aziridine carboxamide), triethylenemelamine, bisisoprothaloyl-1-(2-methylaziridine) and tri-1-aziridinyl phosphine oxide may be used, but the present application is not limited thereto. In addition, as the metal chelate crosslinking agent, a compound in which a polyvalent metal such as aluminum, iron, zinc, tin, titanium, antimony, magnesium or vanadium is coordinated to acetyl acetone or ethyl acetoacetate may be used, but the present application is not limited thereto.

The multifunctional crosslinking agent may be included in the pressure-sensitive adhesive, for example, at 0.01 to 10 parts by weight or 0.01 to 5 parts by weight based on 100 parts by weight of the acryl polymer described above. In this range, the pressure-sensitive adhesive may maintain excellent cohesive strength and durability.

The multifunctional crosslinking agent may crosslink the polymer by reaction with a crosslinkable functional group of the acryl polymer in the formation of the pressure-sensitive adhesive layer such as an aging process.

In the pressure-sensitive adhesive layer having the IPN structure, a crosslinking structure realized by polymerized multifunctional acrylate may be included together with a crosslinking structure realized by an acryl polymer crosslinked by the multifunctional crosslinking agent.

As the multifunctional acrylate, a compound having at least two (meth)acryloyl groups in a molecule may be used without limitation. For example, the multifunctional acrylate may be a bifunctional acrylate such as 1,4-butanediol di(meth)acrylate, 1,6-hexanediol di(meth)acrylate, neopentylglycol di(meth)acrylate, polyethyleneglycol di(meth)acrylate, neopentylglycol adipate di(meth)acrylate, hydroxypivalic acid neopentylglycol di(meth)acrylate, dicyclopentanyl di(meth)acrylate, caprolactone-modified dicyclopentenyl di(meth)acrylate, ethyleneoxide-modified di(meth)acrylate, di(meth)acryloxy ethyl isocyanurate, allylated cyclohexyl di(meth)acrylate, tricyclodecanedimethanol (meth)acrylate, dimethylol dicyclopentane di(meth)acrylate, ethyleneoxide-modified hexahydrophthalic acid di(meth) acrylate, tricyclodecane dimethanol(meth)acrylate, neopentylglycol-modified trimethylpropane di(meth)acrylate, adamantane di(meth)acrylate, or 9,9-bis[4-(2-acryloyloxyethoxy)phenyl]fluorine; a trifunctional acrylate such as trimethylolpropane tri(meth)acrylate, dipentaerythritol tri(meth)acrylate, propionic acid-modified dipentaerythritol tri(meth)acrylate, pentaerythritol tri(meth)acrylate, propyleneoxide-modified trimethylolpropane tri(meth)acrylate, trifunctional urethane(meth)acrylate, or tris(meth)acryloxyethylisocyanurate; a tetrafunctional acrylate such as diglycerin tetra(meth)acrylate or pentaerythritol tetra(meth)acrylate; a pentafunctional acrylate such as propionic acid-modified dipentaerythritol penta(meth)acrylate; or a hexafunctional acrylate such as dipentaerythritol hexa(meth) acrylate, caprolactone-modified dipentaerythritol hexa (meth)acrylate, or urethane(meth)acrylate (e.g. a reaction product of an isocyanate monomer and trimethylolpropane tri(meth)acrylate). In some cases, the multifunctional acrylate may be a photocurable oligomer known in the art, which may be any kind of urethane acrylate, polycarbonate acrylate, polyester acrylate, polyether acrylate or epoxy acrylate.

The multifunctional acrylate may be used alone or in combination of at least two thereof. The acrylate having a molecular weight of less than 1,000 and at least trifunctional acrylate be used in an aspect of realizing durability, but the present application is not limited thereto.

The multifunctional acrylate may include a ring structure in a backbone structure. As such acrylate is used, the contraction or expansion of the polarizer may be more effectively inhibited, and the light leakage inhibition effect may be enhanced. The ring structure included in the multifunctional acrylate may be a carbocyclic or heterocyclic structure, or a monocyclic or polycyclic structure. The multifunctional acrylate may be, but is not limited to, a monomer having an isocyanurate structure such as tris(meth)acryloxy ethyl isocyanuarate or hexafunctional acrylate such as isocyanate-modified urethane(meth)acrylate (e.g. a reaction product of an isocyanate monomer and trimethylolpropane tri(meth) acrylate).

The multifunctional acrylate may be included in the pressure-sensitive adhesive layer at 20 to 200 parts by weight based on 100 parts by weight of the acryl polymer, and thus may more effectively control the tensile modulus of the pressure-sensitive adhesive layer and maintain excellent durability.

The pressure-sensitive adhesive layer may further include a silane coupling agent. The silane coupling agent serves to enhance the cohesion and adhesion stability of the pressure-sensitive adhesive, improve thermal resistance and humidity resistance, and enhance adhesion reliability even when the pressure-sensitive adhesive is left for a long time under a severe condition. For example, the silane coupling agent may be, γ-glycidoxypropyl triethoxy silane, γ-glycidoxypropyl trimethoxy silane, γ-glycidoxypropyl methyldiethoxy silane, γ-glycidoxypropyl triethoxy silane, 3-mercaptopropyl trimethoxy silane, vinyltrimethoxysilane, vinyltriethoxy silane, γ-methacryloxypropyl trimethoxy silane, γ-methacryloxy propyl triethoxy silane, γ-aminopropyl trimethoxy silane, γ-aminopropyl triethoxy silane, 3-isocyanatopropyl triethoxy silane, γ-acetoacetatepropyl trimethoxysilane, acetoacetatepropyl triethoxy silane, β-cyanoacetyl trimethoxy silane, β-cyanoacetyl triethoxy silane, or acetoxyacetotrimethoxy silane, which may be used alone or in combination of at least two thereof. In the present application, a silane-based coupling agent having an acetoacetate or β-cyanoacetyl group may be used, but the present application is not limited thereto. In the pressure-sensitive adhesive layer, the silane coupling agent may be included at 0.01 to 5 parts by weight, and preferably 0.01 to 1 part by weight based on 100 parts by weight of the acryl polymer, and thus the pressure-sensitive adhesive strength and durability may be effectively maintained.

The pressure-sensitive adhesive layer may further include a tackifier resin. The tackifier resin may be a hydrocarbon-based resin or a hydrogenated product thereof, a rosin resin or a hydrogenated product thereof, a rosin ester resin or a hydrogenated product thereof, a terphene resin or a hydrogenated product thereof, a terphene phenol resin or a hydrogenated product thereof, a polymerized rosin resin and a polymerized rosin ester resin, which may be used alone or in combination of at least two thereof. The tackifier resin may be included at 1 to 100 parts by weight based on 100 parts by weight of the acryl polymer.

The pressure-sensitive adhesive layer may further include at least one additive selected from the group consisting of an epoxy resin, a curing agent, a UV stabilizer, an antioxidant, a coloring agent, a reinforcing agent, a filler, a foaming agent, a surfactant and a plasticizer as long as it does not affect the desired effect.

A method of forming the pressure-sensitive adhesive layer is not particularly limited. In one example, the pressure-sensitive adhesive layer may be formed by a method of preparing a pressure-sensitive adhesive composition by mixing the components described above, coating the pressure-sensitive adhesive composition on a suitable process base using a conventional means such as a bar coater or a comma coater, and curing the composition. In addition, a method of curing the pressure-sensitive adhesive composition is not particularly limited, and for example, the composition may not be cured by sequentially or simultaneously performing a method of aging the composition at a suitable temperature such that a crosslinking reaction of the acryl polymer and the multifunctional crosslinking agent may progress and a process of radiating electromagnetic waves to enable the multifunctional acrylate to be polymerized. The radiation of the electromagnetic waves may be performed using a means such as a high pressure mercury lamp, an electrodeless lamp or a xenon lamp. In addition, conditions for radiating electromagnetic waves are not particularly limited, as long as the conditions are controlled to appropriately execute the polymerization of the multifunctional acrylate without degrading all the physical properties. For example, the radiation of electromagnetic waves may be performed for a suitable time by controlling a luminance to 50 to 2,000 mW/cm$^2$ and an intensity of radiation of 10 to 1,000 mJ/cm$^2$.

Meanwhile, in consideration of the efficiency of the curing process by the radiation of the electromagnetic waves, a photoinitiator may be included in the pressure-sensitive adhesive composition. As the photoinitiator, any one that can generate radicals by the radiation of electromagnetic waves and start the curing reaction may be used without particular limitation. For example, the photoinitiator may be benzoin, benzoin methylether, benzoin ethylether, benzoin isopropylether, benzoin n-butylether, benzoin isobutylether, acetophenone, dimethylamino acetophenone, 2,2-dimethoxy-2-phenylacetophenone, 2,2-diethoxy-2-phenylacetophenone, 2-hydroxy-2-methyl-1-phenylpropane-1-one, 1-hydroxycyclohexylphenylketone, 2-methyl-1-[4-(methylthio)phenyl]-2-morpholino-propane-1-one, 4-(2-hydroxyethoxy)phenyl-2-

(hydroxy-2-propyl)ketone, benzophenone, p-phenylbenzophenone, 4,4'-diethylaminobenzophenone, dichlorobenzophenone, 2-methylanthraquinone, 2-ethylanthraquinone, 2-t-butylanthraquinone, 2-aminoanthraquinone, 2-methylthioxanthone, 2-ethylthioxanthone, 2-chlorothioxanthone, 2,4-dimethylthioxanthone, 2,4-diethylthioxanthone, benzyldimethylketal, acetophenone dimethylketal, p-dimethylamino benzoic acid ester, oligo[2-hydroxy-2-methyl-1-[4-(1-methylvinyl)phenyl]propanone] or 2,4,6-trimethylbenzoyl-diphenyl-phosphineoxide, which may be used alone or in combination of at least two thereof, but the present application is not limited thereto.

The photoinitiator may be included at 0.2 to 20 parts by weight, 0.2 to 10 parts by weight, or 0.2 to 5 parts by weight based on 100 parts by weight of the acryl polymer. The photoinitiator may be included at 0.2 to 20 parts by weight based on 100 parts by weight of the multifunctional acrylate. According to such control, the reaction of the multifunctional acrylate may be effectively induced, and degradation in physical properties of the pressure-sensitive adhesive due to remaining components after curing may be prevented.

The pressure-sensitive adhesive layer may also be formed using a heat-curable or room temperature-curable pressure-sensitive adhesive composition, and in this case, the pressure-sensitive adhesive layer may include an acryl polymer crosslinked by a multifunctional crosslinking agent.

Similar to the photocurable composition described above, the acryl polymer may be a polymer having a molecular weight of 500,000 to 2,500,000, and including a (meth)acrylic acid ester-based monomer and a crosslinkable monomer in a polymerization unit, or a polymer including 80 to 99.9 parts by weight of a (meth)acrylic acid ester-based monomer and 0.1 to 20 parts by weight of a crosslinkable monomer in a polymerization unit. Here, specific kinds of the (meth)acrylic acid ester-based monomer and the crosslinkable monomer or the method of preparing the polymer are the same as described above. In addition, the polymer may also include a functional monomer represented by Formula 16.

In addition, as the multifunctional crosslinking agent crosslinking the acryl polymer in the pressure-sensitive adhesive layer, an isocyanate crosslinking agent, an epoxy crosslinking agent, an aziridine crosslinking agent or a metal chelate crosslinking agent may also be used as described above. Such a crosslinking agent may be included at a suitable content within a range of 0.01 to 10 parts by weight, for example, 0.01 to 5 parts by weight based on 100 parts by weight of the acryl polymer in consideration of the tensile modulus, durability and cohesion of the pressure-sensitive adhesive layer.

The above method of forming the pressure-sensitive adhesive layer is similar to that for the photocurable pressure-sensitive adhesive described above, except that the curing process by the radiation of electromagnetic waves is not performed. That is, the pressure-sensitive adhesive layer may be formed by preparing the pressure-sensitive adhesive composition by suitably mixing necessary components, coating the composition on a suitable base, and curing the composition. The heat-curable pressure-sensitive adhesive composition may further include at least one additive selected from the group consisting of a silane coupling agent, a tackifier resin, an epoxy resin, a curing agent, a UV stabilizer, an antioxidant, a coloring agent, a reinforcing agent, a filler, a foaming agent, a surfactant and a plasticizer when necessary.

When the pressure-sensitive adhesive layer is formed in a multi-layered structure such as at least double-layered structure, the pressure-sensitive adhesive layer constituting the multi-layered structure may be formed using suitable kinds, for example, the same or different kinds of the heat-curable, room temperature-curable, moisture-curable and photocurable adhesive compositions.

In one example, when the pressure-sensitive adhesive layer includes a first pressure-sensitive adhesive layer forming a first surface, and a second pressure-sensitive adhesive layer forming a second surface, and the first surface is attached to the polarizer, the pressure-sensitive adhesive layer may be formed using a pressure-sensitive adhesive composition realizing an IPN structure as the first photocurable pressure-sensitive adhesive composition. Therefore, in one example, the first pressure-sensitive adhesive layer may include a crosslinking structure including an acryl polymer crosslinked by a multifunctional crosslinking agent and a crosslinking agent including polymerized multifunctional acrylate.

The polarizing plate may further include a protective film attached to one or both surfaces, for example, one surface, specifically, a surface of the polarizer opposite to the surface on which the adhesive layer and the pressure-sensitive adhesive layer are sequentially disposed. As the protective film, a cellulose-based film such as a TAC film, a polyester-based film such as a poly(ethylene terephthalate)) (PET) film, a polycarbonate-based film, a polyestersulfone-based film, or a polyolefin-based film such as an acryl-based and/or a polyethylene film, a polypropylene film, a cyclic polyolefin film or polyolefin film having a norbornene structure or an ethylene-propylene copolymer film may be used, but the present application is not limited thereto. The protective film may be attached to the polarizer by means of, for example, an adhesive layer conventionally used to attach the protective film.

The polarizing plate may further include a releasing film attached under the pressure-sensitive adhesive layer. As the releasing film, a conventional component known in the art may be employed.

The polarizing plate may further include at least one functional layer selected from the group consisting of an anti-reflection layer, an anti-glare layer, a phase retardation plate, a wide viewing angle compensation film and a brightness enhancement film when necessary.

The exemplary LCD device of the present application may include a liquid crystal panel and the polarizing plate attached to one or both surfaces of the liquid crystal panel.

The kind of the liquid crystal panel included in the LCD device is not particularly limited. For example, a known panel such as a passive matrix-type panel such as a twisted nematic (TN), super twisted nematic (STN), ferroelectric (F) or polymer dispersed (PD) panel, an active matrix-type panel such as a two or three terminal panel, an in-plane switching (IPS) panel or a vertically-aligned (VA) panel may be used without limitation.

In addition, kinds of other components constituting the LCD device, for example, upper and lower substrates (e.g., a color filter substrate or an array substrate), are not particularly limited either, and any components known in the art may be employed without limitation.

ADVANTAGEOUS EFFECT

One exemplary polarizing plate has lighter weight, a smaller thickness, and excellent physical properties such as durability, water resistance, workability, and light leakage preventing ability. In addition, one exemplary polarizing plate does not induce curling occurring in the polarizing plate or a polarizer in formation thereof, and has excellent thermal resistance or thermal shock resistance.

DETAILED DESCRIPTION OF EXEMPLARY EMBODIMENTS

Figure 1:
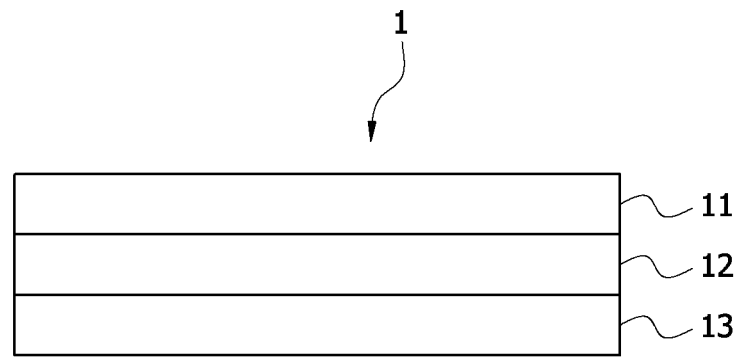
FIG. 1 is a diagram illustrating a structure of an exemplary polarizing plate.
Figure 2:
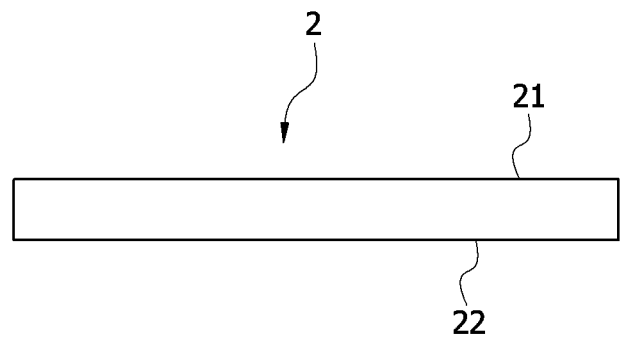
FIGS. 2 and 3 are cross-sectional views illustrating exemplary pressure-sensitive adhesive layers of the present application.
Figure 3:
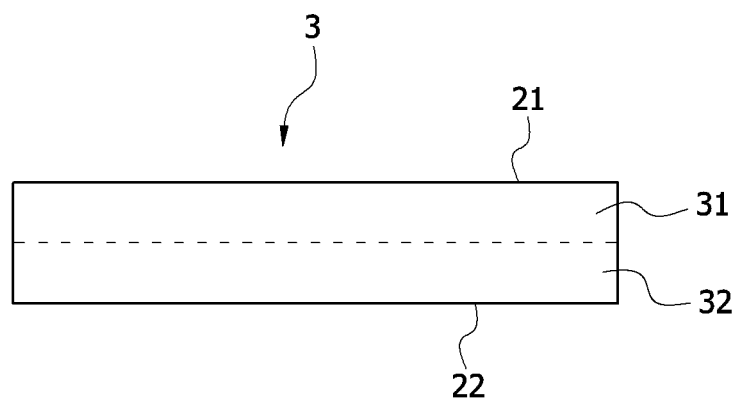

Hereinafter, the present application will be described with reference to Examples according to the present application and Comparative Examples not according to the present application in detail. However, the scope of the present application is not limited to the following Examples.

Preparation Example 1

Preparation of Acryl Polymer (A)

98 parts by weight of n-butyl acrylate (n-BA) and 2 parts by weight of 2-hydroxyethyl acrylate (2-HEA) were put into a 1 L reactor refluxing nitrogen gas and equipped with a cooling device to facilitate temperature control. Subsequently, 180 parts by weight of ethyl acetate (EAc) was put as a solvent into the reactor, which was purged with the nitrogen gas for 60 minutes to remove oxygen. Afterwards, the temperature was maintained at 67° C., 0.05 parts by weight of azobisisobutyronitrile (AIBN) was put into the reactor as a reaction initiator, and the reaction was carried out for 8 hours. After the reaction, the reaction product was diluted with ethyl acetate, and thus an acryl polymer (A) having a solid content of 30 wt %, a weight average molecular weight of 1,000,000, and a distribution of molecular weight of 4.9 was prepared.

Preparation Examples 2 to 5

Preparation of Acryl Polymers (B) to (D)

Acryl polymers (B) to (D) were prepared based on the method as described in Preparation Example 1, except that the monomer compositions were changed as shown in Table 1. The weight average molecular weights and distributions of molecular weight of the prepared polymers are listed in Table 1.

TABLE 1

|  |  | A | B | C | D |
|---|---|---|---|---|---|
| Monomer | n-BA | 98 | 98 | 98 | 80 |
| Composition | 2-HEA | 2 | 2 | — | 20 |
| (Parts by Weight) | AA | — | — | 2 | — |
| Weight Average Molecular Weight (10,000) |  | 100 | 190 | 100 | 100 |
| Distribution of Molecular weight |  | 4.9 | 5.5 | 5.4 | 4.9 | n-BA: n-butyl acrylate
2-HEA: 2-hydroxy ethyl acrylate
AA: acrylic acid

Preparation Example 6

Preparation of Adhesive Composition

An adhesive composition was prepared by mixing 55 parts by weight of 2-hydroxyethyl acrylate (2-HEA), 20 parts by weight of phenoxyethyl acrylate, 15 parts by weight of isobornyl acrylate and 5 parts by weight of poly[(phenyl glycidyl ether)-CO-formaldehyde], which is a novolac epoxy resin having a molecular weight of 3000, as an epoxy compound, and mixing 4 parts by weight of a radical initiator (TPO, Darocure TPO) and 1 part by weight of IHT-PI43 (50% mixed triarylsulfonium hexafluorophosphate salt and 50% propylene carbonate) as a cationic polymerization initiator with the mix.

Example 1

Preparing First Pressure-Sensitive Adhesive Layer

A first pressure-sensitive adhesive composition was prepared by mixing 100 parts by weight of the acryl polymer (A), 3 parts by weight of a multifunctional crosslinking agent (TDI-based isocyanate, Coronate L, Nippon Polyurethane Industry (Japan)), 100 parts by weight of multifunctional acrylate (trifunctional urethane acrylate, Aronix M-315), 3 parts by weight of a photoinitiator (Irgacure 184, hydroxycyclohexylphenylketone, Ciba Specialty Chemicals (Switzerland)) and 0.1 parts by weight of a silane coupling agent (M812, silane coupling agent having a β-cyanoacetyl group, LG Chem (Korea)) in a solvent to have a solid concentration of 30 wt %. Subsequently, the prepared pressure-sensitive adhesive composition was coated on a releasing-treated surface of a poly(ethylene terephthalate) (PET) releasing film (thickness: 38 μm, MRF-38, Mitsubishi) subjected to releasing treatment to have a dry thickness of 25 μm, and the resulting film was dried in an oven at 110° C. for 3 minutes. Then, a releasing-treated surface of the PET releasing film (thickness: 38 μm, MRF-38, Mitsubishi) subjected to releasing treatment, was further laminated on the dried coating layer, and UV rays were radiated under the following conditions, thereby forming a first pressure-sensitive adhesive layer between two of the PET releasing films. A tensile modulus (at 25° C.) of the formed first pressure-sensitive adhesive layer was 300 MPa. In the embodiment, the tensile modulus was measured according to the following method.

<Conditions for UV Radiation>
UV Radiation Tool: High Pressure Mercury Lamp
Radiation Conditions:
Luminance: 600 mW/cm$^2$
Intensity of Radiation: 150 mJ/cm$^2$ Preparing Second Pressure-Sensitive Adhesive Layer A second pressure-sensitive adhesive composition was prepared by mixing 100 parts by weight of the acryl polymer (A), 0.01 parts by weight of a multifunctional crosslinking agent, (TDI-based isocyanate, Coronate L, Nippon Polyurethane Industry (Japan)) and 0.1 parts by weight of a silane coupling agent (M812, silane coupling agent having a β-cyanoacetyl group, LG Chem (Korea)) in a solvent to have a solid concentration of 30 wt %. Subsequently, the prepared pressure-sensitive adhesive composition was coated on a releasing-treated surface of a PET releasing film (thickness: 38 μm, MRF-38, Mitsubishi) subjected to releasing treatment to have a dry thickness of 25 μm, and the resulting film was dried in an oven at 110° C. for 3 minutes. Then, a releasing-treated surface of the releasing-treated PET releasing film (thickness: 38 μm, MRF-38, Mitsubishi) was further laminated on the dried coating layer. A tensile modulus (at 25° C.) of the formed second pressure-sensitive adhesive layer was 0.06 MPa.

Subsequently, the formed first pressure-sensitive adhesive layer and the second pressure-sensitive adhesive layer were laminated to each other, thereby forming a pressure-sensitive adhesive layer having a double-layered structure.

Preparing Polarizing Plate

An acryl film (which was formed by extruding and extending a mixture including phenoxy resin, polystyrene and polymethylmethacrylate) was laminated as a protective film to one surface of a polarizer formed by extending a polyvinylalcohol-based resin film, dying the film with iodine and treating the film with a boric acid aqueous solution using the previously prepared adhesive composition. Subsequently, a polarizing plate was formed by laminating the previously formed double-layered pressure-sensitive adhesive layer to a surface of the polyvinylalcohol-based polarizer to which the protective film was not attached using the prepared adhesive composition. In detail, a polarizing plate was formed by coating the adhesive composition on the polarizer, laminating the first pressure-sensitive adhesive layer of the double-layered pressure-sensitive adhesive layer to the coated surface, and curing the first pressure-sensitive adhesive layer by radiation of UV rays under the following conditions.

<Conditions for UV Radiation>
UV Radiation Tool: High Pressure Mercury Lamp
Radiation Conditions:
Luminance: 800 mW/cm$^2$
Intensity of Radiation: 2000 mJ/cm$^2$ Examples 2 to 7 and Comparative Examples 1 to 4

A polarizing plate was formed based on the same method as described in Example 1, except that the compositions of the first and second pressure-sensitive adhesive layers were changed as shown in Tables 2 and 3. However, in Comparative Examples 1 to 4, the double-layered pressure-sensitive adhesive was not used, but a single-layered pressure-sensitive adhesive having a first pressure-sensitive adhesive was used.

TABLE 2

| | | | Example | | | | | | |
|---|---|---|---|---|---|---|---|---|---|
| | | | 1 | 2 | 3 | 4 | 5 | 6 | 7 |
| First pressure-sensitive adhesive | Pressure-sensitive adhesive composition | Kind of Acryl Polymer | A | B | C | D | A | A | A |
| | | Content of Acryl Polymer | 100 | 100 | 100 | 100 | 100 | 100 | 100 |
| | | Content of Multifunctional Crosslinking Agent | 3 | 3 | 3 | 3 | 3 | 3 | 3 |
| | | MFA1 Content | 100 | 100 | 100 | 100 | 100 | — | 100 |
| | | MFA2 Content | — | — | — | — | — | 50 | — |
| | | Content of Photoinitiator | 3 | 3 | 3 | 3 | 3 | 3 | 3 |
| | | Content of Silane Coupling Agent | 0.1 | 0.1 | 0.1 | 0.1 | 0.1 | 0.1 | 0.1 |
| | | UV Curing Method | ○ | ○ | ○ | ○ | ○ | ○ | ○ |
| | Pressure-sensitive adhesive | Thickness (μm) | 25 | 25 | 25 | 25 | 25 | 25 | 25 |
| | | Tensile Modulus | 300 | 300 | 350 | 850 | 300 | 400 | 300 |
| Second pressure-sensitive adhesive | Pressure-sensitive adhesive composition | Kind of Acryl Polymer | A | A | A | A | A | A | C |
| | | Content of Acryl Polymer | 100 | 100 | 100 | 100 | 100 | 100 | 100 |
| | | Content of Multifunctional Crosslinking Agent | 0.01 | 0.01 | 0.01 | 0.01 | 0.01 | 0.01 | 0.01 |
| | | MFA1 Content | — | — | — | — | 10 | — | — |
| | | MFA2 Content | — | — | — | — | — | — | — |
| | | Content of Photoinitiator | — | — | — | — | 1 | — | — |
| | | Content of Silane Coupling Agent | 0.1 | 0.1 | 0.1 | 0.1 | 0.1 | 0.1 | 0.1 |
| | | UV Curing Method | X | X | X | X | ○ | X | X |
| | Pressure-sensitive adhesive composition | Thickness (μm) | 25 | 25 | 25 | 25 | 25 | 25 | 25 |
| | | Tensile Modulus | 0.06 | 0.06 | 0.06 | 0.06 | 0.6 | 0.06 | 0.06 |

Content Unit: parts by weight
Multifunctional Crosslinking Agent: TDI-based isocyanate crosslinking agent (Coronate L, Nippon Polyurethane Industry)
MFA1: trifunctional urethane acrylate (Aronix M-315, Toa Gosei K.K)
MFA2: hexafunctional urethane acrylate (UA 306I, Kyoeisha)
Photoinitiator: hydroxycyclohexylphenyl ketone (Irgacure 184, Ciba Specialty Chemicals)
Silane Coupling Agent: silane coupling agent having a β-cyanoacetyl group (M812, LG Chem)
Tensile Modulus: tensile modulus at 25° C.,
Unit: MPa

TABLE 3

|  |  |  | Comparative Example | | | |
|---|---|---|---|---|---|---|
|  |  |  | 1 | 2 | 3 | 4 |
| First pressure-sensitive adhesive | Pressure-sensitive adhesive composition | Kind of Acryl Polymer | A | A | A | A |
|  |  | Content of Acryl Polymer | 100 | 100 | 100 | 100 |
|  |  | Content of Multifunctional Crosslinking Agent | 3 | 0.01 | 0.01 | 0.01 |
|  |  | MFA1 Content | 100 | — | 10 | 10 |
|  |  | MFA2 Content | 3 | — | — | — |
|  |  | Content of Photoinitiator | 3 | — | 1 | 1 |
|  |  | Content of Silane Coupling Agent | 0.1 | 0.1 | 0.1 | 0.1 |
|  |  | UV Curing Method | ○ | X | ○ | ○ |
|  | Pressure-sensitive adhesive composition | Thickness (μm) | 25 | 25 | 25 | 50 |
|  |  | Tensile Modulus (MPa)(25° C.) | 300 | 0.06 | 0.6 | 0.6 |

Content Unit: parts by weight
Multifunctional Crosslinking Agent: TDI-based isocyanate crosslinking agent (Coronate L, Nippon Polyurethane Industry)
MFA1: trifunctional urethane acrylate (Aronix M-315, Toa Gosei K.K)
MFA2: hexafunctional urethane acrylate (UA 306I, Kyoeisha)
Photoinitiator: hydroxycyclohexylphenyl ketone (Irgacure 184, Ciba Specialty Chemicals)
Silane Coupling Agent: silane coupling agent having a β-cyanoacetyl group (M812, LG Chem)

Example 8

A polarizing plate was formed based on the same method as described in Example 1, except that an adhesive composition prepared by mixing 44.5 parts by weight of 2-hydroxyethyl acrylate (2-HEA), 15 parts by weight of phenoxyethyl acrylate, 9 parts by weight of isobornyl acrylate, and 15 parts by weight of Celloxide 2021P, which is a epoxy resin and 10 parts by weight of poly[(phenyl glycidyl ether)-CO-formaldehyde], which is a novolac epoxy resin having a molecular weight of 3000 as epoxy compounds, and mixing 3 parts by weight of a radical initiator (CGI 819, bis(2,4,6-trimethylbenzoyl)-phenylphosphineoxide), 3 parts by weight of an iodine initiator (Irgacure 250, Ciba Specialty Chemicals) as a cationic initiator and 0.5 parts by weight of a photosensitizer (isopropyl thioxanthone, Aldrich) with the mix was used.

Example 9

A polarizing plate was formed based on the same method as described in Example 1, except that an adhesive composition prepared by mixing 50 parts by weight of 2-hydroxyethyl acrylate (2-HEA), 20 parts by weight of phenoxyethyl acrylate, 15 parts by weight of isobornyl acrylate and 5 parts by weight of poly[(phenyl glycidyl ether)-CO-formaldehyde], which is a novolac epoxy resin having a molecular weight of 3000 as an epoxy compound, and mixing 4 parts by weight of a radical initiator (TPO, Darocure TPO), 3 parts by weight of an iodine initiator as a cationic initiator and 2 parts by weight of a photosensitizer (diethyl thioxanthone, Kayacure DTEX-S, Nippon Kayaku) with the mix was used.

Comparative Example 5

A polarizing plate was formed based on the same method as described in Example 1, except that a TAC film having a thickness of 60 μm was used as a protective film instead of the acryl film, a water-based polyvinylalcohol-based adhesive composition generally used to attach a protective film was coated as an adhesive attaching the TAC film to the polarizer to have a dry thickness of 0.1 μm, the water-based polyvinylalcohol-based adhesive composition was coated, the protective film was laminated and dried in an oven at 80° C. for 5 minutes, and a double-layered pressure-sensitive adhesive layer was laminated using the water-based polyvinylalcohol-based adhesive composition.

<Evaluation of Physical Properties>
1. Evaluation of Tensile Modulus

Herein, a tensile modulus of a pressure-sensitive adhesive was measured by a tensile stress-strain test according to a method defined in ASTM D638, or when it was difficult to directly measure a tensile modulus, a storage modulus was measured by the following method and then converted by the following Conversion Formula. In detail, a sample having a stacked structure of a PET releasing film (thickness: 38 μm, MRF-38), a pressure-sensitive adhesive layer and a PET releasing film (thickness: 38 μm, MRF-38), formed in Examples or Comparative Examples, was cut into a dog bone-type specimen in a size of 7 cm (length)×1 cm (width), both ends of the specimen were fixed with jigs for a tensile test, and a tensile modulus was measured according to ASTM D638. The conditions for measuring the tensile modulus were as follows.

<Conditions for Measuring Tensile Modulus>
Measuring Tool: Universal Testing Machine (UTM)
Equipment Model: Zwick Roell Z010, Instron
Measurement Conditions:
Load Cell: 500 N
Tensile Speed: 3 mm/sec <Measurement of Storage Modulus and Conversion into Tensile Modulus>

A pressure-sensitive adhesive layer was cut in a size of 15 cm×25 cm×25 μm (width×length×thickness), and then the cut pressure-sensitive adhesive layers were stacked in five layers. Subsequently, after the stacked adhesive layers were cut in a circle having a diameter of 8 mm, the cut stacked adhesive layers are left overnight while they are pressed using glasses to enhance wettability at an interface between the layers, thereby removing air bubbles generated during stacking. As a result, a specimen was prepared. Subsequently, the specimen was placed on a parallel plate, and a gap was adjusted. Then, after Normal & Torque was set to zero, and the stabilization of a normal force was checked, the storage modulus was measured under the following conditions, and a tensile modulus was calculated according to the following Conversion Formula.

Measurement Tool and Measuring Conditions
Measurement Tool: ARES-RDA, TA Instruments Inc. with forced convection oven
Measuring Conditions:
Geometry: 8 mm parallel plate
Gap: around 1 mm
Test Type: dynamic strain frequency sweep
Strain=10.0 [%], temperature: 30° C.
Initial Frequency: 0.4 rad/s, final frequency: 100 rad/s $$E=3G \qquad \text{<Conversion Formula>}$$

In Conversion Formula, E is a tensile modulus, and G is a storage modulus.

2. Evaluation of Peel Strength and Repeelability

A specimen was formed by cutting a polarizing plate in a size of 25 mm×100 mm (width×length). Subsequently, a PET releasing film was peeled off from the specimen, and the specimen of the polarizing plate was attached to alkali-free glass using a laminator by means of a pressure-sensitive adhesive layer. Afterward, the specimen was compressed in an autoclave (50° C., 0.5 atm) for approximately 20 minutes, and stored under constant temperature and humidity conditions (23° C., relative humidity of 50%) for 25 hours. Then, using a texture analyzer (TA) (Stable Micro System (United Kingdom)), the polarizing plate was peeled off from the alkali-free glass at a peel rate of 300 mm/min and a peel angle of 180 degrees to measure a peel strength. In addition, repeelability was evaluated under the following criteria:

<Criteria for Evaluation of Repeelability>
○: A day after attachment, the peel strength was 800 N/25 mm or less.
Δ: A day after attachment, the peel strength was 1,000 N/25 mm or more.
x: A day after attachment, the peel strength was 2,000 N/25 mm or more.

3. Evaluation of Durability and Reliability 2 specimens were prepared by cutting a specimen prepared by cutting a polarizing plate in a size of 90 mm×170 mm (width×length) per Example or Comparative Example. Subsequently, the two specimens were attached to both surfaces of a glass substrate (110 mm×190 mm×0.7 mm=width×length×thickness) such that an optical absorption axes crossed, thereby preparing a sample. A pressure applied during attachment was approximately 5 kg/cm², and the attachment was carried out in a clean room to avoid air bubbles or extraneous materials at an interface.

The humidity and thermal resistance of the sample was determined by observing whether air bubbles or peeling were generated at a pressure-sensitive adhesive interface after the sample was left for 1,000 hours under conditions including a temperature of 60° C. and a relative humidity of 90%.

In addition, the thermal resistance was determined by observing whether air bubbles or peeling were generated at an adhesive interface after the sample was left at a temperature of 80° C. for 1,000 hours.

The formed samples were left at room temperature for 24 hours, followed by the evaluation of the humidity and thermal resistance or thermal resistance. Evaluation conditions were as follows:

<Criteria for Evaluation of Durability and Reliability>
○: No air bubbles and/or peeling were generated.
Δ: Air bubbles and/or peeling were somewhat generated.
x: Air bubbles and/or peeling were considerably generated.

4. Evaluation of Water Resistance

Polarizing plates formed in Examples and Comparative Examples were cut in a size of 90 mm×170 mm (width×length), thereby forming specimens. Each specimen was attached to a glass substrate (110 mm×190 mm×0.7 mm=width×length×thickness), thereby forming a sample. A pressure applied during attachment was approximately 5 kg/cm², and the attachment was executed in a clean room to prevent bubbles or impurities at an interface. Subsequently, the formed sample was put into water at 60° C., left for 24 hours, and it was observed whether bubbles or peeling were generated. The water resistance was evaluated according to the following criteria.

<Criteria for Evaluation of Water Resistance>
○: No air bubbles and/or peeling were generated.
Δ: Some bubbles and/or peeling were generated at an interface.
x: Bubbles and/or peeling were considerably generated.

5. Evaluation of Uniformity of Light Transmission

Polarizing plates formed in Examples and Comparative Examples were attached to a 22-inch LCD monitor (LG Philips LCD) in a state in which optical axes crossed, stored under constant temperature and humidity conditions (23° C., relative humidity: 50%) for 24 hours, and left at 80° C. for 200 hours. Subsequently, light was radiated to the monitor using a back light in a dark room, and the uniformity of light transmission was evaluated according to the following criteria:

<Criteria for Evaluation of Uniformity of Light Transmission>
◎: when non-uniformity of light transmission was not observed in four peripheral regions of a monitor by eyes
○: when non-uniformity of light transmission was observed slightly in four peripheral regions of a monitor by eyes
Δ: when non-uniformity of light transmission was observed somewhat in four peripheral regions of a monitor by eyes
x: when non-uniformity of light transmission was observed considerably in four peripheral regions of a monitor by eyes 6. Evaluation of Weight Average Molecular Weight and Distribution of Molecular Weight The weight average molecular weight and the distribution of the molecular weight of an acryl polymer were measured using GPC under the following conditions. To draw a calibration curve, standard polystyrene of an Agilent system was used, and measurement results were converted.

<Conditions for Measuring Weight Average Molecular Weight>
Measuring Tool: Agilent GPC (Agilent 1200 series, USA)
Column: two connected PL mixed B
Column Temperature: 40° C.
Eluent: Tetrahydro furan
Flow Rate: 1.0 mL/min
Concentration: ~2 mg/mL (100 μL injection)

7. Evaluation of Curling Characteristic

Figure 4:
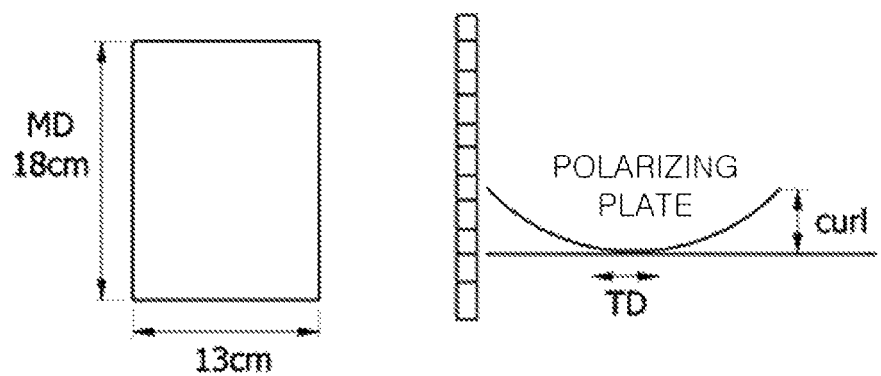
FIG. 4 is a schematic diagram illustrating a method of evaluating a curling characteristic.

A curling characteristic was evaluated according to the following criteria by laminating a protective film cut in a size of 130 mm×180 mm (width direction (transverse direction (TD))×length (MD direction)) with a polarizer using an adhesive composition during an operation of forming a polarizing plate and measuring curling occurring in the TD direction during radiation of UV rays or drying when a water-based polyvinylalcohol-based adhesive was used. The measurement of curling was executed by the method illustrated in FIG. 4.

<Evaluation Criteria>
○: Curling occurring in the TD direction was less than 0.5 cm.
Δ: Curling occurring in the TD direction was 0.5 cm to 2.0 cm
x: Curling occurring in the TD direction was more than 2.0 cm The measurement results are summarized and shown in Table 4.

TABLE 4

| | | Kind of Protective Film | Curing Type of Adhesive | Kind of Adhesive | Peel Strength (N/25 mm) | Repeel-ability | Thermal Resistance | Humidity & Thermal Resistance | Water Resistance | Curling Characteristic | Uniformity of Light Transmission |
|---|---|---|---|---|---|---|---|---|---|---|---|
| Example | 1 | Acryl | UV Rays | Hybrid | 500 | ○ | ○ | ○ | ○ | ○ | ◉ |
| | 2 | Acryl | UV Rays | Hybrid | 500 | ○ | ○ | ○ | ○ | ○ | ◉ |
| | 3 | Acryl | UV Rays | Hybrid | 500 | ○ | ○ | ○ | ○ | ○ | ◉ |
| | 4 | Acryl | UV Rays | Hybrid | 500 | ○ | ○ | ○ | ○ | ○ | ◉ |
| | 5 | Acryl | UV Rays | Hybrid | 400 | ○ | ○ | ○ | ○ | ○ | ◉ |
| | 6 | Acryl | UV Rays | Hybrid | 500 | ○ | ○ | ○ | ○ | ○ | ○ |
| | 7 | Acryl | UV Rays | Hybrid | 800 | ○ | ○ | ○ | ○ | ○ | ○ |
| | 8 | Acryl | UV Rays | Hybrid | 500 | ○ | ○ | ○ | ○ | ○ | ◉ |
| | 9 | Acryl | UV Rays | Hybrid | 500 | ○ | ○ | ○ | ○ | ○ | ◉ |
| Comparative Example | 1 | Acryl | UV Rays | Hybrid | 30 | ○ | X | X | X | ○ | X |
| | 2 | Acryl | UV Rays | Hybrid | 500 | Δ | X | X | X | ○ | X |
| | 3 | Acryl | UV Rays | Hybrid | 500 | ○ | Δ | X | X | ○ | X |
| | 4 | Acryl | UV Rays | Hybrid | 500 | ○ | Δ | Δ | Δ | ○ | Δ |
| | 5 | TAC | Water-based Dry | Hybrid | 500 | ○ | ○ | ○ | ○ | X | ◉ |

What is claimed is:

1. A polarizing plate, comprising:
a polarizer; an active energy beam-curable adhesive layer; and a pressure-sensitive adhesive layer, which are sequentially disposed,
wherein the active energy beam-curable adhesive layer includes an adhesive composition including an epoxy compound and an acryl-based monomer in a cured state,
wherein the epoxy compound includes an alicyclic epoxy compound and a glycidyl ether-type epoxy compound,
wherein the pressure-sensitive adhesive layer includes a first pressure-sensitive adhesive layer forming a first surface; and a second pressure-sensitive adhesive layer forming a second surface, and the first and second surfaces include pressure-sensitive adhesive layers having different tensile modulus,
wherein the active energy beam-curable adhesive layer is directly attached to at least one surface of the polarizer, and the first surface of the pressure-sensitive adhesive layer is directly attached to the adhesive layer,
wherein the first surface has a higher tensile modulus than the second surface,
wherein the first surface has a tensile modulus at 25° C. of 1 to 1,000 MPa, and
wherein the second surface has a tensile modulus at 25° C. of 0.01 to 1.0 MPa.

2. A polarizing plate, comprising:
a polarizer; an active energy beam-curable adhesive layer; and a pressure-sensitive adhesive layer, which are sequentially disposed,
wherein the active energy beam-curable adhesive layer includes an adhesive composition including an epoxy compound and an acryl-based monomer in a cured state,
wherein the epoxy compound includes an alicyclic epoxy compound and a glycidyl ether-type epoxy compound,
wherein the pressure-sensitive adhesive layer includes a first pressure-sensitive adhesive layer forming a first surface; and a second pressure-sensitive adhesive layer forming a second surface, and the first and second surfaces include pressure-sensitive adhesive layers having different tensile modulus,
wherein the first surface has a tensile modulus at 25° C. of 1 to 1,000 MPa, and
wherein the second surface has a tensile modulus at 25° C. of 0.01 to 1.0 MPa.

3. A polarizing plate, comprising:
a polarizer; an active energy beam-curable adhesive layer; and a pressure-sensitive adhesive layer, which are sequentially disposed,
wherein the pressure-sensitive adhesive layer includes a first pressure-sensitive adhesive layer forming a first surface; and a second pressure-sensitive adhesive layer forming a second surface, and the first and second surfaces include pressure-sensitive adhesive layers having different tensile modulus,
wherein the active energy beam-curable adhesive layer includes an adhesive composition including an epoxy compound and an acryl-based monomer in a cured state, and
wherein the epoxy compound includes an alicyclic epoxy compound and a glycidyl ether-type epoxy compound.

4. A polarizing plate, comprising:
a polarizer; an active energy beam-curable adhesive layer; and a pressure-sensitive adhesive layer, which are sequentially disposed,
wherein the pressure-sensitive adhesive layer includes a first pressure-sensitive adhesive layer forming a first surface; and a second pressure-sensitive adhesive layer forming a second surface, and the first and second surfaces include pressure-sensitive adhesive layers having different tensile modulus,
wherein the active energy beam-curable adhesive layer includes an adhesive composition including an epoxy compound and an acryl-based monomer in a cured state,
wherein the epoxy compound includes an alicyclic epoxy compound and a glycidyl ether-type epoxy compound, and
wherein the epoxy compound has a weight average molecular weight of 1,000 to 5,000.

5. A polarizing plate, comprising:
a polarizer; an active energy beam-curable adhesive layer; and a pressure-sensitive adhesive layer, which are sequentially disposed, wherein the pressure-sensitive adhesive layer includes a first pressure-sensitive adhesive layer forming a first surface; and a second pressure-sensitive adhesive layer forming a second surface, and the first and second surfaces include pressure-sensitive adhesive layers having different tensile modulus, wherein the active energy beam-curable adhesive layer includes an adhesive composition including an epoxy compound and an acryl-based monomer in a cured state, wherein the epoxy compound includes an alicyclic epoxy compound and a glycidyl ether-type epoxy compound, and wherein the acryl-based monomer is a hydrophilic acryl-based monomer or a hydrophobic acryl-based monomer.

6. The polarizing plate according to claim 5, wherein the hydrophilic acryl-based monomer has a hydroxyl group, a carboxyl group or an alkoxy group.

7. A polarizing plate, comprising:

a polarizer; an active energy beam-curable adhesive layer; and a pressure-sensitive adhesive layer, which are sequentially disposed, wherein the pressure-sensitive adhesive layer includes a first pressure-sensitive adhesive layer forming a first surface; and a second pressure-sensitive adhesive layer forming a second surface, and the first and second surfaces include pressure-sensitive adhesive layers having different tensile modulus, wherein the active energy beam-curable adhesive layer includes an adhesive composition including an epoxy compound, an acryl-based monomer, and 1 to 40 parts by weight of a reactive oligomer in a cured state, and wherein the epoxy compound includes an alicyclic epoxy compound and a glycidyl ether-type epoxy compound.

8. A polarizing plate, comprising:

a polarizer; an active energy beam-curable adhesive layer; and a pressure-sensitive adhesive layer, which are sequentially disposed, wherein the pressure-sensitive adhesive layer includes a first pressure-sensitive adhesive layer forming a first surface; and a second pressure-sensitive adhesive layer forming a second surface, and the first and second surfaces include pressure-sensitive adhesive layers having different tensile modulus, wherein the active energy beam-curable adhesive layer includes a non-solvent type adhesive composition including an epoxy compound and an acryl-based monomer in a cured state, and wherein the epoxy compound includes an alicyclic epoxy compound and a glycidyl ether-type epoxy compound.

9. A polarizing plate, comprising:

a polarizer; an active energy beam-curable adhesive layer; and a pressure-sensitive adhesive layer, which are sequentially disposed, wherein the pressure-sensitive adhesive layer includes a first pressure-sensitive adhesive layer forming a first surface; and a second pressure-sensitive adhesive layer forming a second surface, and the first and second surfaces include pressure-sensitive adhesive layers having different tensile modulus, wherein the active energy beam-curable adhesive layer includes an adhesive composition including an epoxy compound and an acryl-based monomer in a cured state, and having a viscosity at 25° C. of 5 to 1,000 cps, and wherein the epoxy compound includes an alicyclic epoxy compound and a glycidyl ether-type epoxy compound.

10. A liquid crystal display device, comprising:

a liquid crystal panel; and a polarizing plate which is attached to one or both surfaces of the liquid crystal panel, and which comprises a polarizer; an active energy beam-curable adhesive layer; and a pressure-sensitive adhesive layer, which are sequentially disposed, wherein the active energy beam-curable adhesive layer includes an adhesive composition including an epoxy compound and an acryl-based monomer in a cured state, wherein the epoxy compound includes an alicyclic epoxy compound and a glycidyl ether-type epoxy compound, wherein the pressure-sensitive adhesive layer includes a first pressure-sensitive adhesive layer forming a first surface; and a second pressure-sensitive adhesive layer forming a second surface, and the first and second surfaces include pressure-sensitive adhesive layers having different tensile modulus, wherein the liquid crystal panel is attached to the second pressure-sensitive adhesive layer, wherein the first surface has a tensile modulus at 25° C. of 1 to 1,000 MPa, and wherein the second surface has a tensile modulus at 25° C. of 0.01 to 1.0 MPa.

11. A liquid crystal display device, comprising:

a liquid crystal panel; and a polarizing plate which is attached to one or both surfaces of the liquid crystal panel, and which comprises a polarizer; an active energy beam-curable adhesive layer; and a pressure-sensitive adhesive layer, which are sequentially disposed, wherein the active energy beam-curable adhesive layer includes an adhesive composition including an epoxy compound and an acryl-based monomer in a cured state, wherein the epoxy compound includes an alicyclic epoxy compound and a glycidyl ether-type epoxy compound, wherein the pressure-sensitive adhesive layer includes a first pressure-sensitive adhesive layer forming a first surface; and a second pressure-sensitive adhesive layer forming a second surface, and the first and second surfaces include pressure-sensitive adhesive layers having different tensile modulus, wherein the liquid crystal panel is a passive matrix-type panel, an active matrix-type panel, an in-plane switching panel or a vertically-aligned panel, wherein the first surface has a tensile modulus at 25° C. of 1 to 1,000 MPa, and wherein the second surface has a tensile modulus at 25° C. of 0.01 to 1.0 MPa.

* * * * *